W. McCAMMON.
Car Brake.

No. 4,886. Patented Dec. 12, 1846.

UNITED STATES PATENT OFFICE.

WILLIAM McCAMMON, OF ALBANY, NEW YORK.

BRAKE FOR CAR-WHEELS.

Specification of Letters Patent No. 4,886, dated December 12, 1846; Antedated June 12, 1846.

*To all whom it may concern:*

Be it known that I, WILLIAM McCAMMON, of Albany, in the county of Albany and State of New York, have invented a new and Improved Self Acting and Retaining Brake for Railroad-Cars, which I denominate the "Anticollision-Brake;" and I do hereby declare the following to be a full, clear, and exact description of the same, reference being had to the accompanying drawings, making a part of this specification.

The nature of my invention consists in attaching friction brakes to rail road cars, and connecting them with the bumpers in such a manner that a violent blow or concussion upon the bumpers will press the rubbers against the periphery of the car wheels, and retain them in that position, until they are relieved by the brakeman. When the engineer discovers that there is danger of coming in collision with another train of cars, or with animals or other obstructions on the track, by reversing the engine, he causes violent concussion between the bumpers, which sets the brakes and causes the rubbers to act with a simultaneous, steady, and powerful friction against the car wheels in the whole train, thus effectually impeding their progress.

Figure 2:
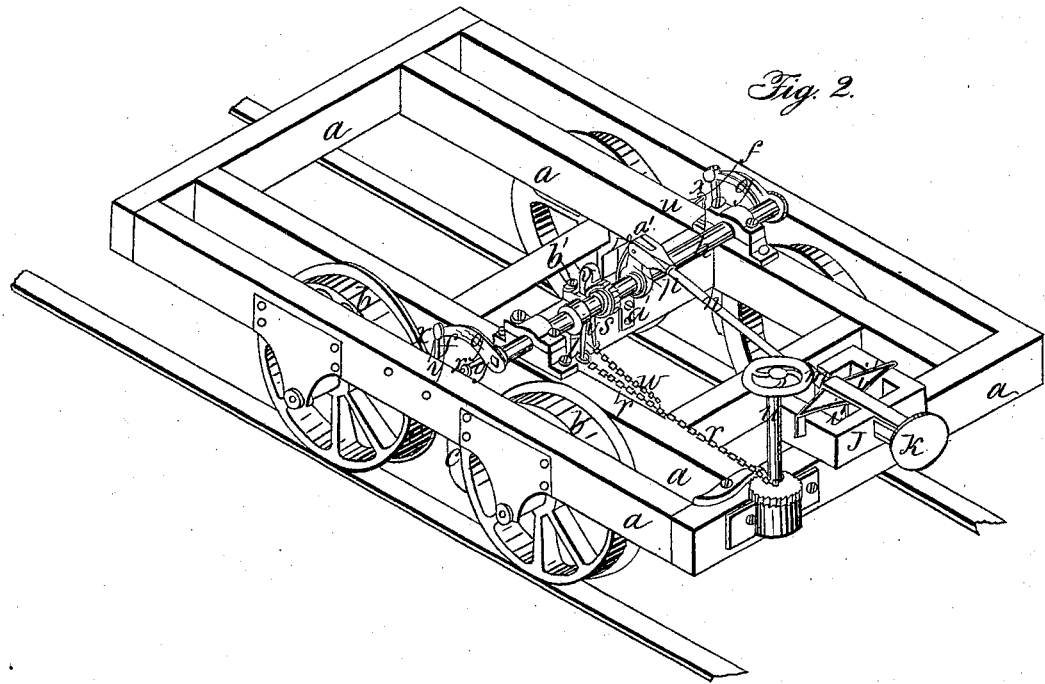
Figure 1:
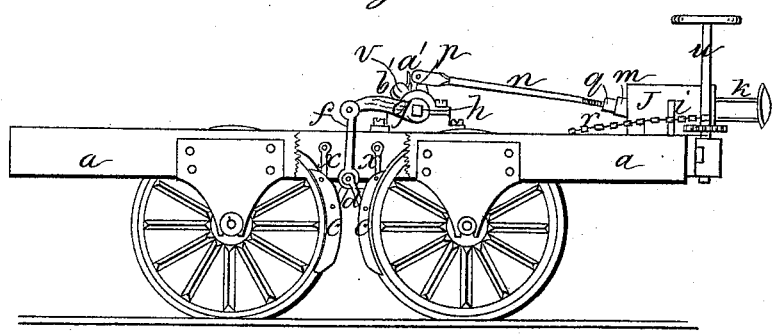

In the accompanying drawings Figure 1 is a side elevation of the frame and wheels of a car—a part of one of the outer side pieces of the frame being broken out for the purpose of showing the arrangement of the brakes. Fig. 2, is a perspective elevation of the same, with my self acting and retaining brake attached thereto.

$a, a$ is the frame on which the car body is supported, constructed in the usual manner.

$b, b$, are the car wheels.

$c, c$, are the brake rubbers, which are placed back to back between the side pieces of the car frame, in a position to act on a couple of pairs of car wheels; they are suspended by, and jointed to, the rods $y, y$, (passing through the side pieces of the car frame) by the connecting pieces $x, x$. The rubbers $c, c$, are acted upon by the motion of the vibrating brake shaft $h$, as hereinafter set forth: The brake shaft $h$, is secured in bearings made fast to the inner side pieces of the car frame, its ends projecting each side of the same; on each end of the brake shaft there are secured in a horizontal position, the arms $g, g$, which are constructed in such a manner as to be slightly elastic. To the ends of the arms $g, g$, are jointed vertical connecting pieces $f, f$, which connect the same with the rubbers $c, c$, by means of the toggle joints $d$, the lower ends of the levers composing the toggle joints are connected to the rubbers $c, c$, by a flexible joint. When the brake shaft is vibrated so as to press down the arms $g, g$, it will readily be perceived that the rubbers will be forced against the periphery of the wheels. The brake shaft $h$, is acted upon as follows: $p$, is a vertical arm rising from the center of the brake shaft; to the end of this arm is jointed a bar $n$, which connects the same with the shaft of the bumper $k$. The shaft of the bumper $k$, passes through a box $J$, secured to the end of the car frame; the bumper shaft is retained steady in one position (except at the moment it is acted upon) by an elliptic spring $i$, which passes through a slot in the same; the spring $i$, has its ends secured in each side of the box $J$; its object is to present a steady pressure upon the bumpers (as in backing a train) from acting on the brake shaft, and causing the brake shaft and rubbers to be acted upon only by concussion of the bumpers.

$m$, is a socket at the inner end of the bumper shaft $k$, which receives the end of the connecting rod $n$.

$q$, is a regulating nut working on a screw on the connecting rod $n$, and fitting against the end of the socket $m$; this nut receives the shock or flow caused by the concussion of the bumpers, which is communicated to the brake shaft $h$, by the connecting rod $n$,—and arm $p$. The force of pressure upon the brake shaft can be regulated therefore by this nut, and can be so adjusted that ordinary shocks, or the backing of the train will not cause the brakes to act on the wheels. When by the concussion of the bumpers the brakes are forced against the wheels, they are caught and retained at their highest point of pressure against them, by means of a ratchet wheel $s$, and a spring pawl $v$. The ratchet wheel $s$ is secured to the brake shaft $h$, and the pawl $v$, is secured by a joint to one of the cross pieces of the car frame. $b'$, is a spring for pressing the pawl upon the ratchet wheel. The brakes are also intended to be worked by hand in the usual manner by means of a capstan $u$.

$l$, is an arm descending vertically from the under side of the brake shaft *h*, from the end of which a chain *r*, is carried to a capstan *u*.

The pawl or click *v*, is disengaged from the ratchet wheel *s*, when it is desired to have the brakes cease acting, as follows— one end of a chain *w*, is attached to the lower end of the pawl, and its other end is attached to the chain *r*,—the inner end of the chain *r*, being left so slack, that in turning the capstan *u*, the pawl *v*, can be detached without acting upon the arm *l*, on the brake shaft. As soon as the pawl *v*, is detached from the ratchet wheel *s*, the spring *a'*, pressing against the arm *p*, turns the brake shaft *h*, and draws the brakes from the wheels: the pawl *v*, is again pressed upon the ratchet wheel *s*, and in conjunction with the spring *a'*, keeps the brake shaft steady and prevents jarring or noise.

I wish it to be understood that I do not confine myself to the particular arrangement of the rubbers *c, c*, herein set forth,— on the contrary any form or arrangement of rubbers may be used in combination with the parts of my invention, that may be preferred.

What I claim as my invention and desire to secure by Letters Patent, is—

The constructing a self acting and self retaining anti collision brake for railroad cars, by means of the combination of the bumper *k*, spring *i*, brake shaft *h*, ratchet *s*, and pawl *v*, with each other and with the rubbers *c, c*, substantially in the manner and for the purpose herein set forth.

WILLIAM McCAMMON.

Witnesses:
Z. C. ROBBINS,
J. A. CUTTING.